US010323700B2

(12) United States Patent
Ince et al.

(10) Patent No.: US 10,323,700 B2
(45) Date of Patent: Jun. 18, 2019

(54) WEDGE CLUTCH WITH WEDGE PLATE SEGMENTS, CAGE AND WAVE SPRING AND METHOD THEREOF

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 241 days.

(21) Appl. No.: 15/438,930

(22) Filed: Feb. 22, 2017

(65) Prior Publication Data

US 2018/0238404 A1    Aug. 23, 2018

(51) Int. Cl.
*F16D 13/20* (2006.01)
*F16D 41/063* (2006.01)
*F16D 15/00* (2006.01)
*F16D 41/061* (2006.01)
*F16D 43/14* (2006.01)

(52) U.S. Cl.
CPC ........... *F16D 41/063* (2013.01); *F16D 15/00* (2013.01); *F16D 41/061* (2013.01); *F16D 43/14* (2013.01)

(58) Field of Classification Search
CPC ...... F16D 41/063; F16D 15/00; F16D 41/061; F16D 43/14; F16D 2023/123; F16D 13/16; F16D 13/26
See application file for complete search history.

(56) References Cited

U.S. PATENT DOCUMENTS

| 3,202,250 | A | * | 8/1965 | Fulton | ................ F16D 41/063 192/45.1 |
| 5,992,592 | A | | 11/1999 | Showalter | |
| 6,109,410 | A | | 8/2000 | Costin | |
| 6,739,440 | B1 | | 5/2004 | Dick | |
| 9,353,802 | B2 | * | 5/2016 | Lee | .................... F16D 13/16 |
| 2006/0021835 | A1 | | 2/2006 | Kimes et al. | |
| 2010/0122883 | A1 | * | 5/2010 | Bartos | ................ F16D 41/16 192/43.1 |
| 2014/0014454 | A1 | * | 1/2014 | Davis | ................ G01C 21/3632 192/45.1 |
| 2014/0332335 | A1 | * | 11/2014 | Strong | .................... F16D 41/06 192/43 |
| 2015/0083539 | A1 | | 3/2015 | Lee et al. | |
| 2018/0180109 | A1 | * | 6/2018 | Ince | .................... F16D 13/16 |
| 2018/0180111 | A1 | * | 6/2018 | Ince | .................... F16D 13/20 |

\* cited by examiner

*Primary Examiner* — Charles A Fox
*Assistant Examiner* — Lillian T Nguyen (57) ABSTRACT

A wedge clutch, including: an axis of rotation; a hub; an inner ring located radially inward of the hub; a cage radially disposed between the hub and the inner ring; a plurality of circumferentially aligned wedge plate segments radially disposed between the hub and the inner ring; and a circumferentially continuous resilient element engaged with the cage and the plurality of circumferentially aligned wedge plate segments, and urging the plurality of circumferentially aligned wedge plate segments radially outward.

20 Claims, 10 Drawing Sheets

WEDGE CLUTCH WITH WEDGE PLATE SEGMENTS, CAGE AND WAVE SPRING AND METHOD THEREOF

TECHNICAL FIELD

The present invention relates generally to a wedge clutch, and more specifically, to a wedge clutch having a plurality of circumferentially aligned wedge plate segments partially contained within a cage and including a circumferentially continuous resilient element urging the wedge plate segments radially outwardly into contact with a hub for the clutch.

BACKGROUND

Known wedge plate clutches, for example for use with all-wheel drive applications, typically use one or more one-piece, scalloped, single-split wedge plates to connect and disconnect two shafts. A single-split wedge plate results in unequal locking pressure in a locked mode, non-rotatably connecting the two shafts. As a result of the unequal locking pressure, the torque-bearing capacity and durability of the clutch are compromised. Further, when the hub of the clutch is mounted to a rotating shaft and the wedge plate is mounted on the outer tapered surface of the hub, in the free-wheel mode (the shafts connected to the clutch are to rotate with respect to each other), centrifugal forces from the rotation of the hub at high speed can force the wedge plate to move radially outward to engage the inner ring of the clutch, resulting in an unintentional shift to the locked mode.

To address the problem of unequal radial movement of the wedge plate, it is known to replace the one-piece wedge plate in a wedge clutch with a plurality of circumferentially aligned wedge plate segments. The wedge segments are arranged around a tapered hub and are positioned with a retaining ring functioning as a spring. However, the retaining ring, like the one-piece wedge plates, has a single-split and therefore does not allow equal radial movement of the wedge segments. The single-split design also limits the ability of the retaining ring to prevent undesired radially outward displacement of the wedge plate segments (due to rotation of the hub) during the free-wheel mode.

Further, known wedge plate clutches have a wedge plate or wedge plate segments having ramp surfaces on the smaller inner diameter that engage with ramps on the outer surface of a hub or inner race. Thus, friction contact forces are concentrated on the smaller inner diameter of the wedge plate or wedge plate segments, limiting torque carrying capacity.

SUMMARY

According to aspects illustrated herein, there is provided a wedge clutch, including: an axis of rotation; a hub; an inner ring located radially inward of the hub; a cage radially disposed between the hub and the inner ring; a plurality of circumferentially aligned wedge plate segments radially disposed between the hub and the inner ring; and a circumferentially continuous resilient element engaged with the cage and the plurality of circumferentially aligned wedge plate segments, and urging the plurality of circumferentially aligned wedge plate segments radially outward.

According to aspects illustrated herein, there is provided a wedge clutch, including: an axis of rotation; a hub including surface sloping radially outward in a first axial direction; an inner ring located radially inward of the hub; a plurality of circumferentially aligned wedge plate segments radially disposed between the hub and the inner ring and in contact with the hub; a cage radially disposed between the hub and the inner ring and including a plurality of retention tabs, each retention tab, included in the plurality of retention tabs, overlapping a respective pair of circumferentially aligned wedge plate segments; and a resilient element engaged with the cage and the plurality of circumferentially aligned wedge plate segments. For a locked mode: the hub is axially displaceable in the first axial direction to displace the plurality of circumferentially aligned wedge plate segments radially inward into contact with the inner ring; and the plurality of circumferentially aligned wedge plate segments is arranged to non-rotatably connect to the hub and the inner ring. For a free-wheel mode: the hub is axially displaceable in a second axial direction, opposite the first axial direction; the resilient element is arranged to displace the plurality of circumferentially aligned wedge plate segments radially outward; and the plurality of circumferentially aligned wedge plate segments is rotatable with respect to the inner ring.

According to aspects illustrated herein, there is provided a wedge clutch, including: an axis of rotation; a hub including a surface with at least one first ramp surface sloping radially inwardly in a first circumferential direction and at least one second ramp surface, connected to the at least one first ramp surface, and sloping radially inwardly in a second circumferential direction, opposite the first circumferential direction, from the at least one first ramp surface; an inner ring located radially inwardly of the hub; and at least one wedge plate segment including a radially outer surface with at least one third ramp surface sloping radially inwardly in the first circumferential direction and at least one fourth ramp surface, connected to the at least one third ramp surface, and sloping radially inwardly, in the second circumferential direction, from the at least one third ramp surface. To implement a locked mode in which the at least one wedge plate segment is non-rotatably connected to the hub and to the inner ring: the hub is rotatable in the second circumferential direction, with respect the at least one wedge plate segment, and the at least one first ramp surface is arranged to frictionally engage the at least one third ramp surface; or the hub is rotatable in the first circumferential direction, with respect the at least one wedge plate segment, and the at least one second ramp surface is arranged to frictionally engage the at least one fourth ramp surface.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 12:
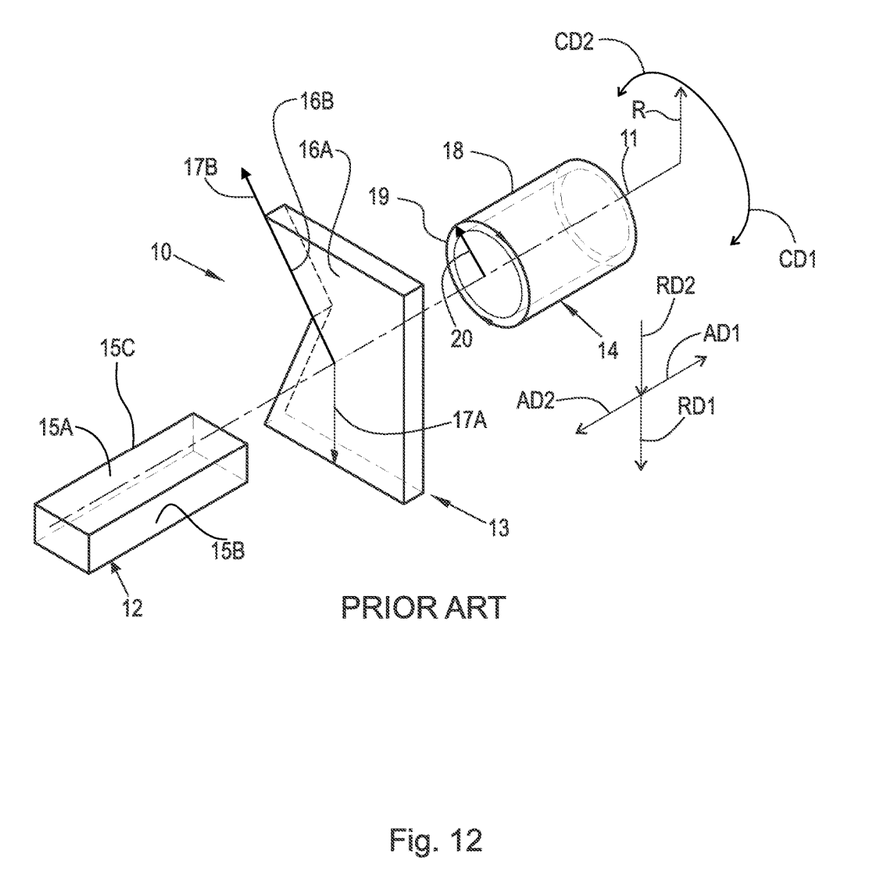
FIG. 12 is a perspective view of a cylindrical coordinate system demonstrating spatial terminology used in the present application.

FIG. 12 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
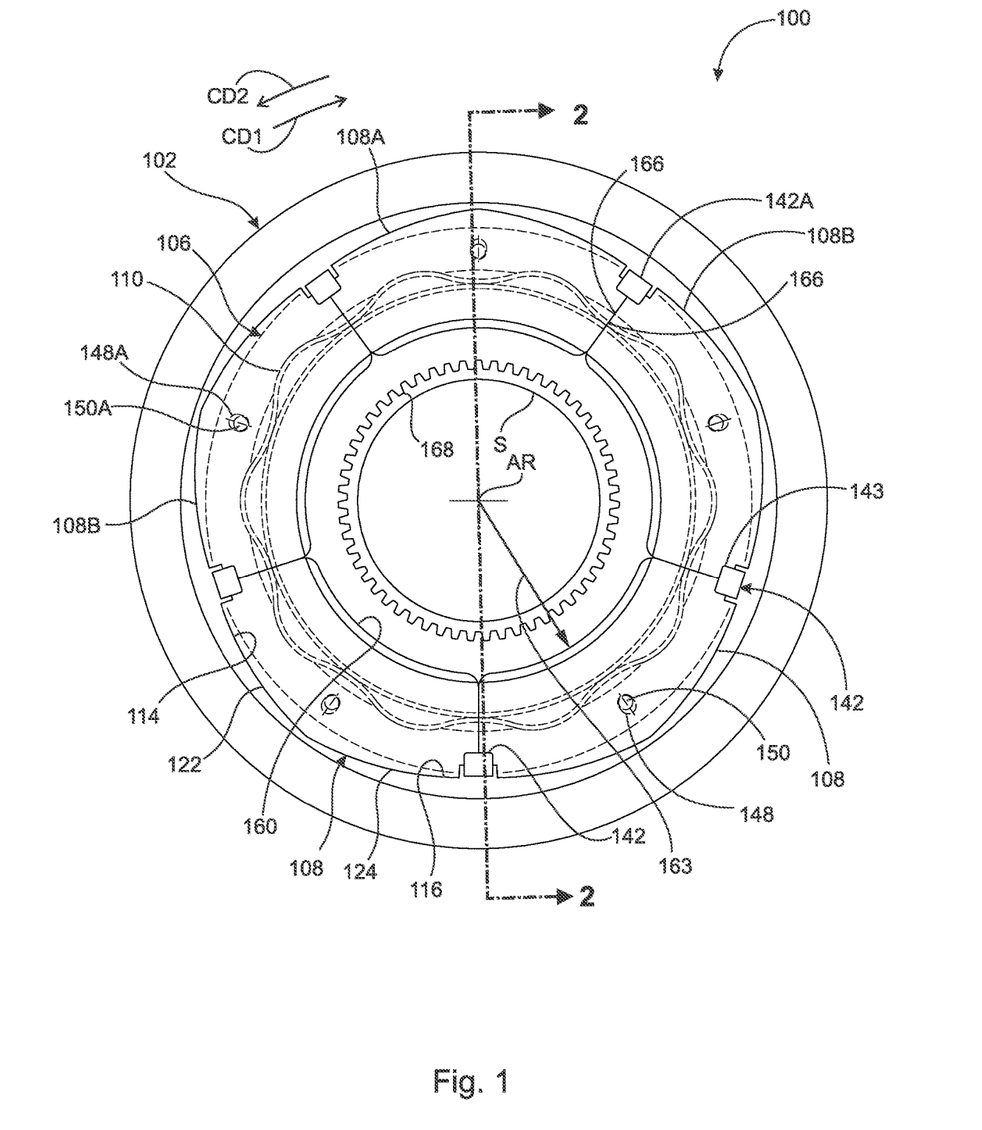
FIG. 1 is a front view of a wedge clutch, in a locked mode, showing a hub, wedge plate segments, a cage, a resilient element, and a shaft.

FIG. 1 is a front view of wedge clutch 100 in a locked mode, showing a hub, wedge plate segments, a cage, a resilient element, and a shaft.

Figure 2:
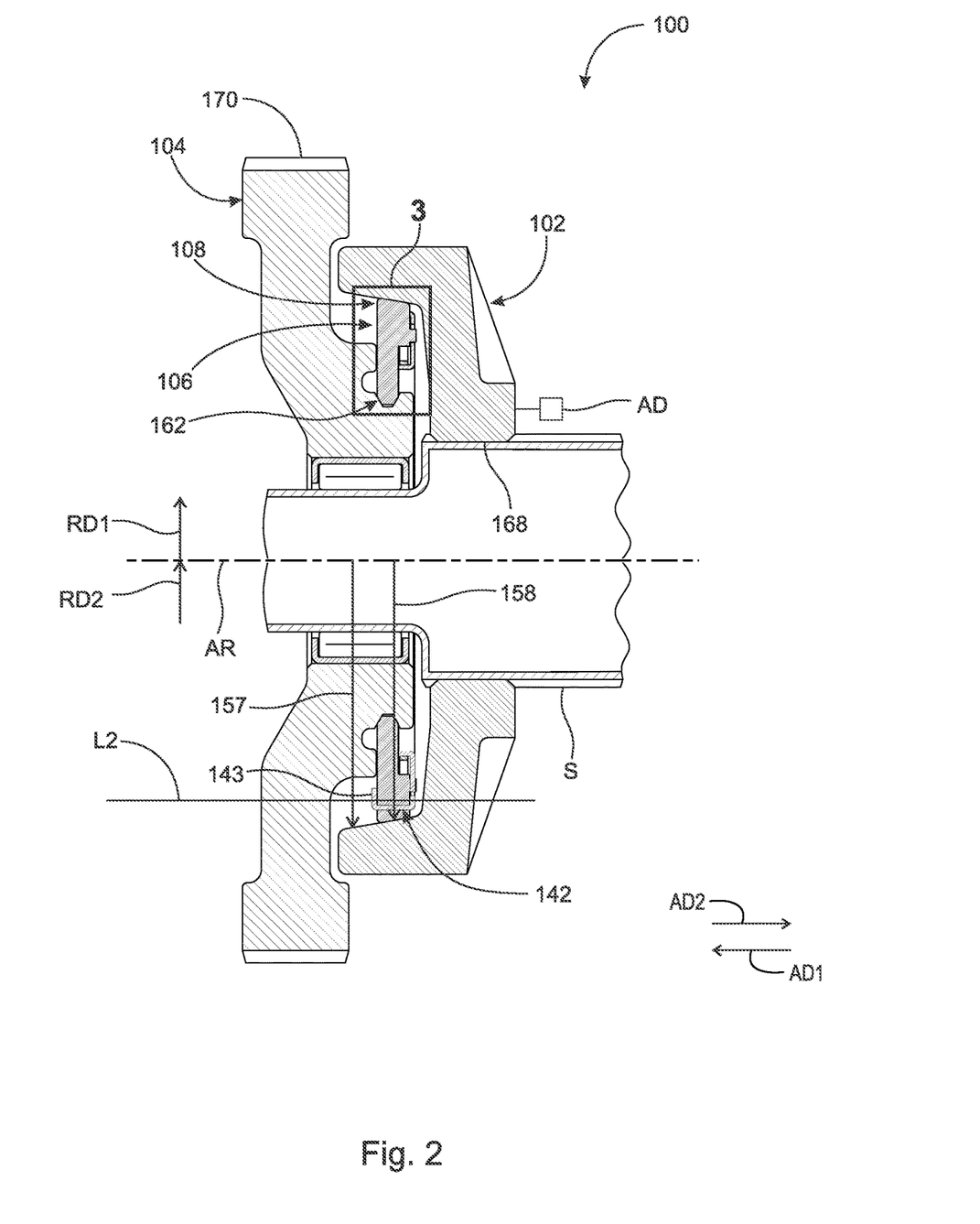
FIG. 2 is a cross-sectional view generally along line 2-2 in FIG. 1, with an inner ring added.

FIG. 2 is a cross-sectional view generally along line 2-2 in FIG. 1.

Figure 3:
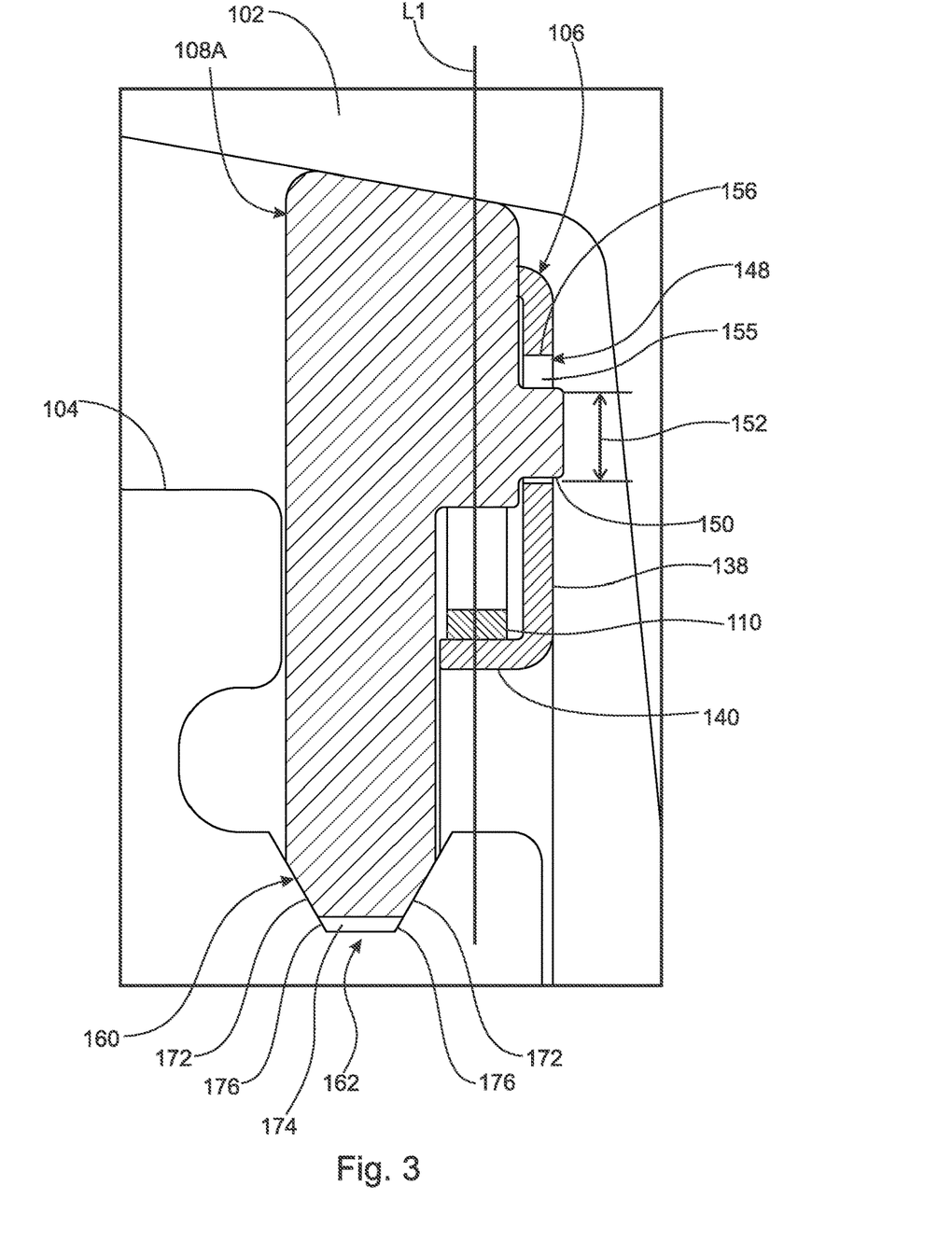
FIG. 3 is a detail of area 3 in FIG. 1.

FIG. 3 is a detail of area 3 in FIG. 1. The following should be viewed in light of FIGS. 1 through 3. Wedge clutch 100 includes: axis of rotation AR; hub 102; inner ring 104; cage 106; circumferentially aligned wedge plate segments 108; and circumferentially continuous resilient element 110. Ring 104 is located radially inward of hub 102. Cage 106 and segments 108 are radially disposed between hub 102 and inner ring 104. Resilient element 110 is engaged with cage 106 and segments 108, and urges segments 108 radially outward in direction RD1. In an example embodiment, element 110 is a wave spring.

Figure 4:
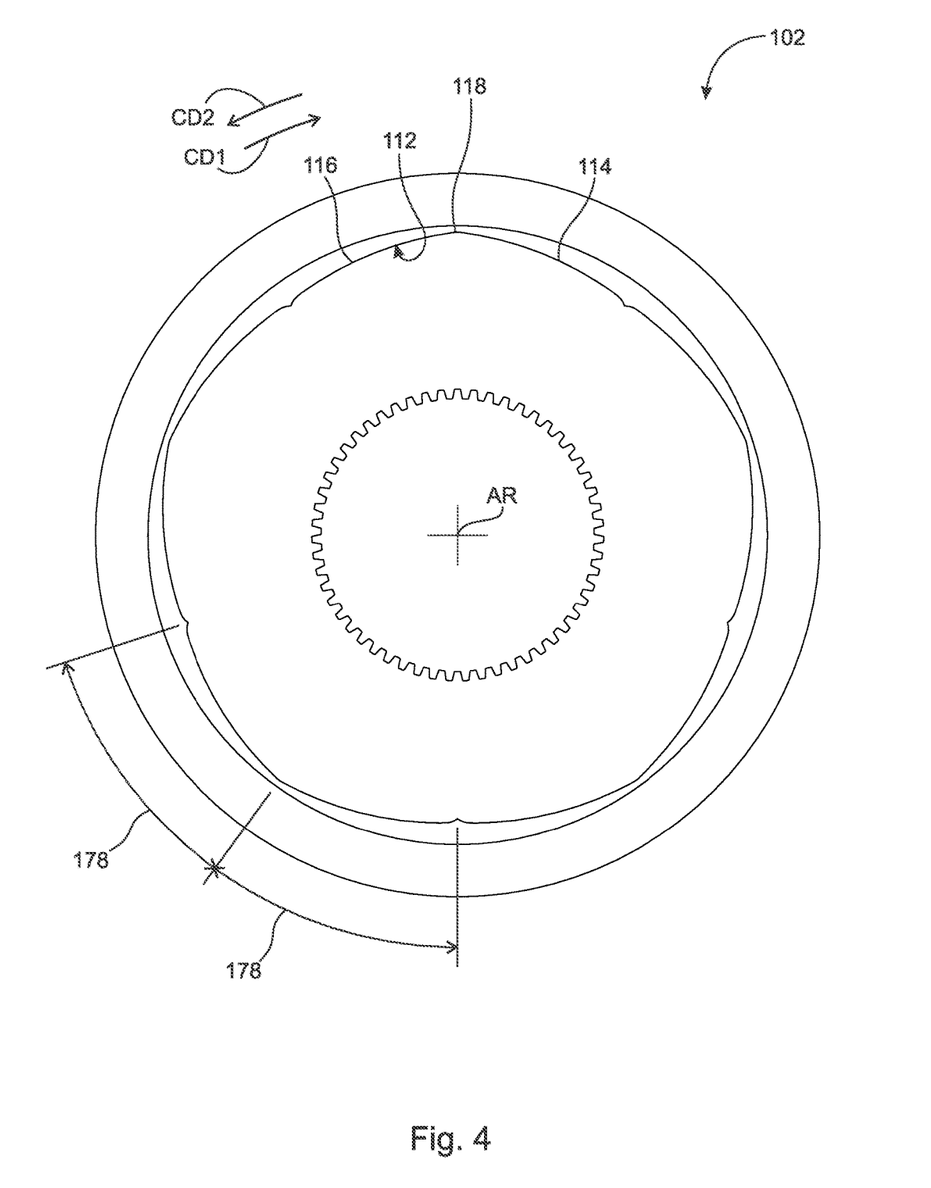
FIG. 4 is a front view of the hub in FIG. 2.

FIG. 4 is a front view of hub 102 in FIG. 1.

Figure 5:
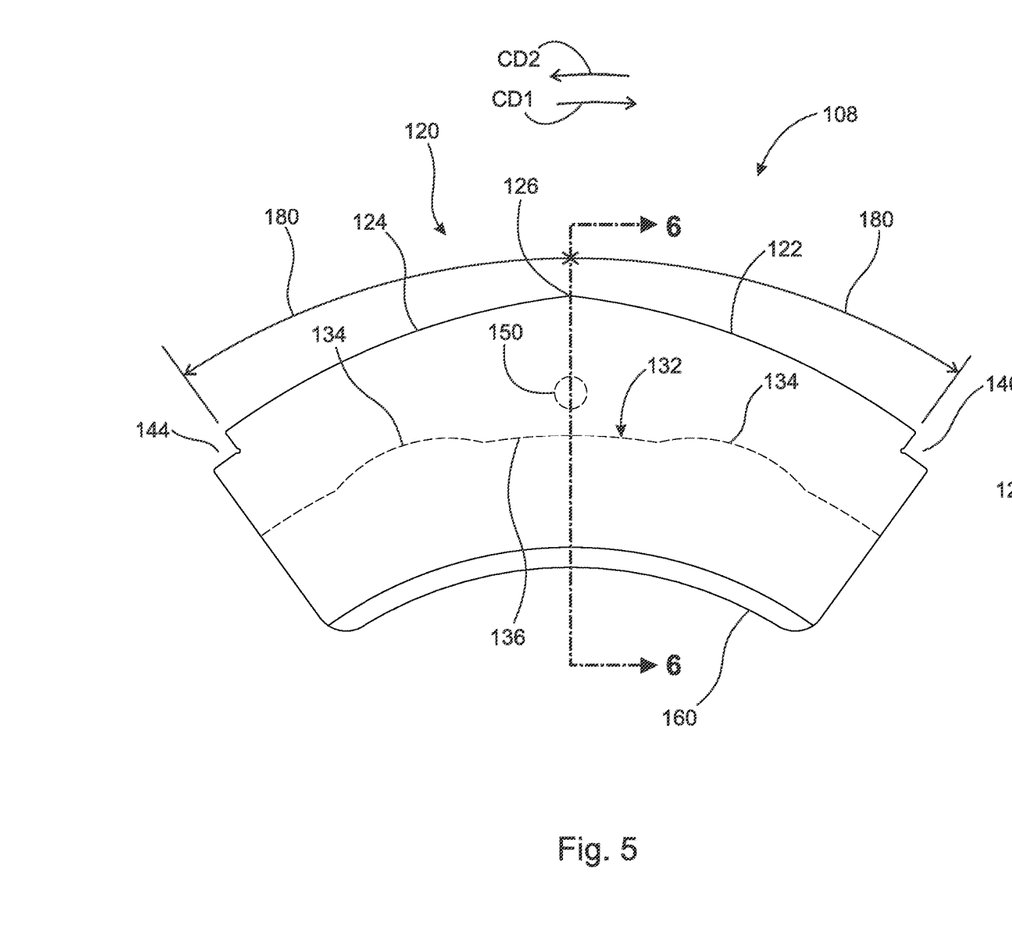
FIG. 5 is a front view of a wedge plate segment in FIG. 2.

FIG. 5 is a front view of a wedge plate segment 108 in FIG. 1.

Figure 6:
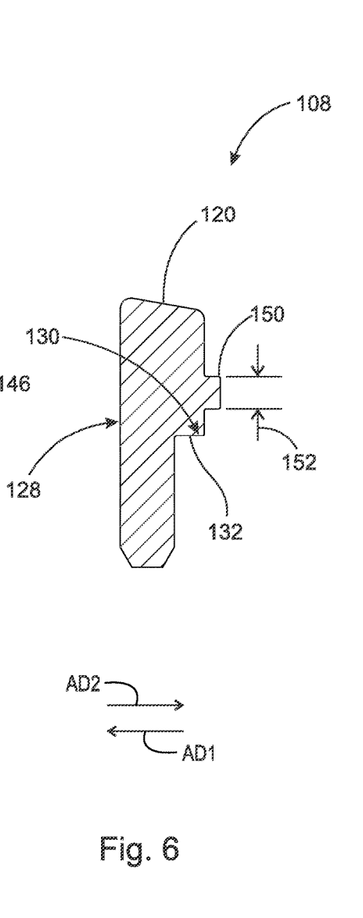
FIG. 6 is a cross-sectional view generally along line 6-6 in FIG. 5.

FIG. 6 is a cross-sectional view generally along line 6-6 in FIG. 5.

Figure 7:
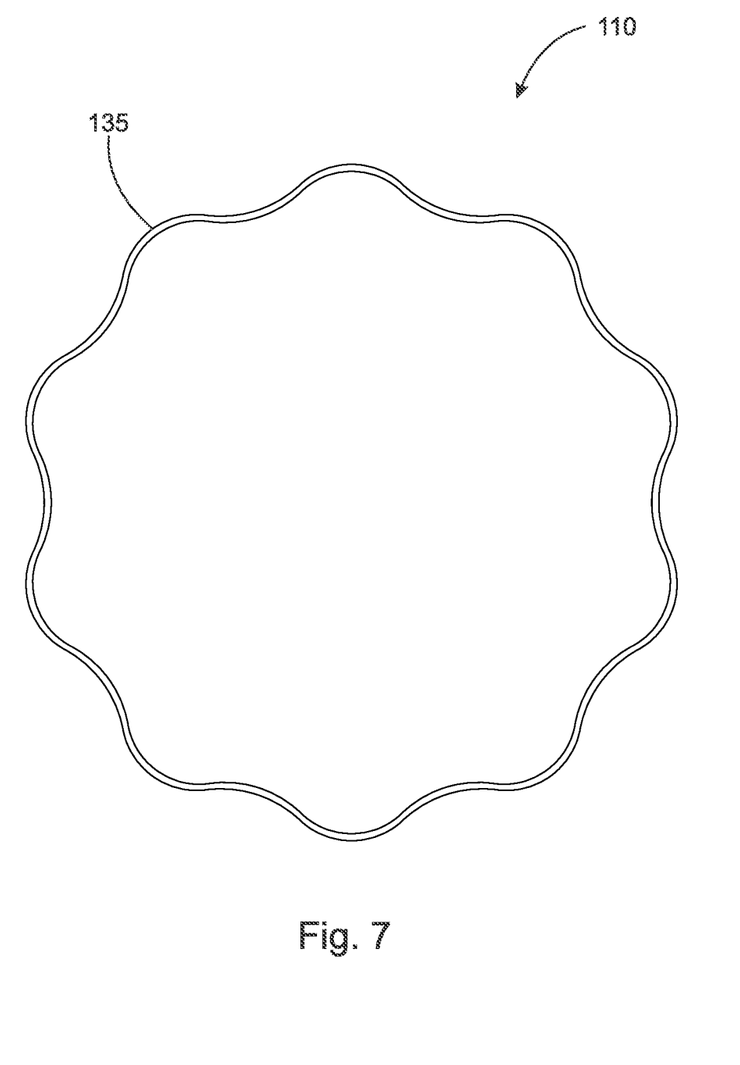
FIG. 7 is a front view of the wave spring in FIG. 2.

FIG. 7 is a front view of resilient element 110 in FIG. 1. The following should be viewed in light of FIGS. 1 through 7. By "circumferentially continuous," we mean that resilient element 110 is a single piece without any breaks or splits, for example as seen in FIG. 7. Hub 102 includes radially inwardly facing surface 112 with pairs of ramps 114 and 116. Each ramp 114 slopes radially inwardly, in direction RD1, from ramp center portion 118 of surface 112, in circumferential direction CD1, and each ramp 116 slopes radially inwardly, from ramp center portion 118, in circumferential direction CD2, opposite direction CD1.

Each segment 108 includes radially outermost surface 120 with pairs of ramps 122 and 124. Each ramp 122 slopes radially inwardly, from center portion 126 of surface 120, in circumferential direction CD1 and each ramp 124 slopes radially inwardly, from center portion 126, in circumferential direction CD2. In the free-wheel mode discussed below, resilient element 110 urges ramps 122 and 124 into contact with ramps 114 and 116, respectively. As further described below, in the locked mode, element 110 urges segments 108 radially outward; however, only ramps 114 and 122 are frictionally and compressively engaged, or only ramps 116 and 124 are frictionally and compressively engaged. In an example embodiment, in the locked mode: while ramps 114 and 122 are frictionally and compressively engaged, ramps 116 and 124 are free of contact; or when ramps 116 and 124 are frictionally and compressively engaged, ramps 114 and 122 are free of contact.

In an example embodiment, each wedge plate segment 108 includes radially extending body portion 128 and shoulder 130 extending from body portion 128 in axial direction AD1 or AD2. Resilient element 110 is engaged with shoulders 130. In an example embodiment, each shoulder 130 includes radially innermost surface 132 and surface 132 includes at least one recess 134 extending radially outwardly. For example, each segment 108 includes two recesses 134 and peak areas 136. Peak areas 136 are the radially innermost portions of surface 132. Resilient element 110 includes radially outermost portions 135 engaged with recesses 134. By one component "engaged with" another component, we mean that the one component is in direct contact with the other component or the components are in contact with a mechanically solid intermediary or ancillary part. For example, a washer or coating could be disposed between the two components. In an example embodiment, resilient element 110 is in direct contact with shoulders 130 and recesses 134. Recesses 134 and peak areas 136 fix a circumferential position of element 110 with respect to segments 108.

Figures 8, 9:
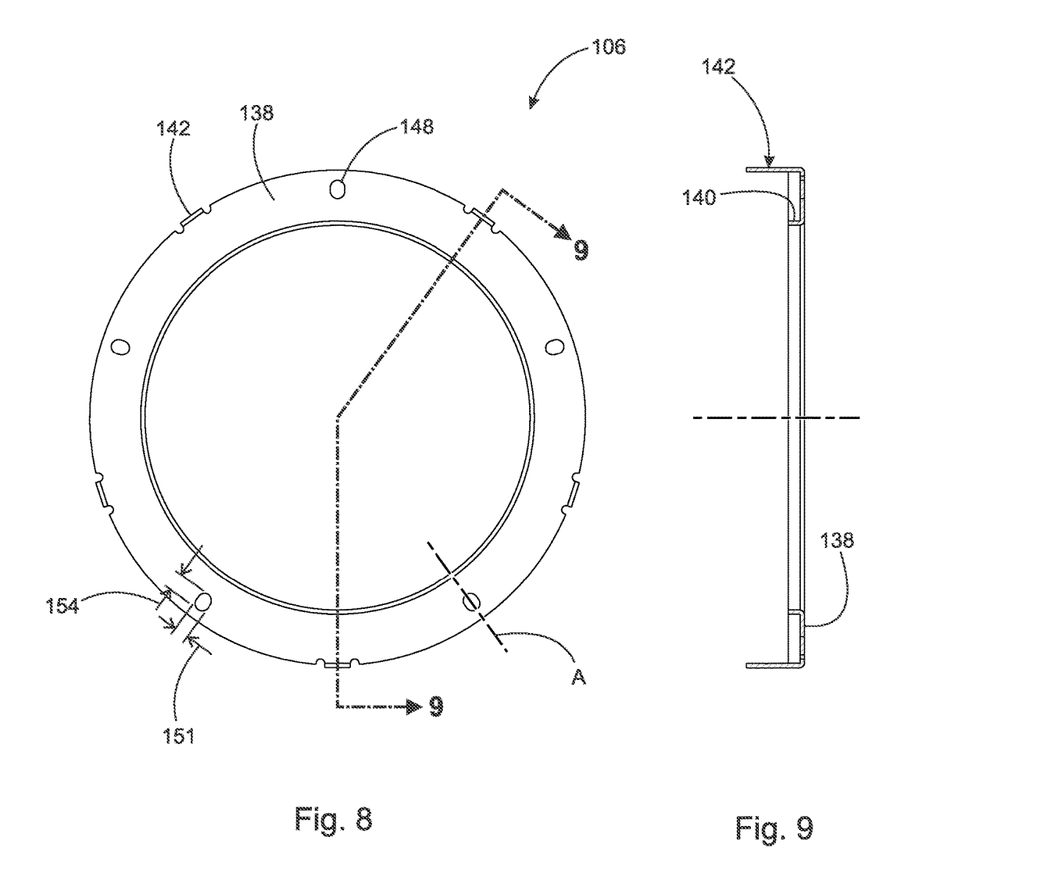
FIG. 8 is a front view of a cage prior to bending the retention tabs.
FIG. 9 is a cross-sectional view generally along line 9-99 in FIG. 8.

FIG. 8 is a front view of cage 106 prior to bending retention tabs.

FIG. 9 is a cross-sectional view generally along line 9-9 in FIG. 8. The following should be viewed in light of FIGS. 2 through 9. In an example embodiment, cage 106 includes radially extending body portion 138 and flange 140 extending in axial direction AD1 from portion 138. Resilient element 110 is engaged with flange 140. Line L1, orthogonal to axis of rotation AR, passes through, in sequence and in direction RD2, hub 102, a wedge plate segment 108, for example segment 108A, resilient element 110, and flange 140. In an example embodiment, line L1 passes through ring 104. In the discussion that follows, capital letters are used to designate a specific component from a group of components otherwise designated by a three digit number, for example, as described above, segment 108A is a specific example of segments 108.

Cage 106 includes retention tabs 142 extending from body portion 138 in axial direction AD1. In FIGS. 8 and 9, cage 106 is shown before wedge clutch 100 is assembled. Assembly entails bending portions 143 of tabs 142 radially inwardly as shown in FIG. 2. As shown in FIG. 1, each tab 142, in particular, portion 143, overlaps, in axial direction AD1 or AD2, two respective circumferentially adjacent wedge plate segments 108. For example, tab 142A overlaps segments 108A and 108B. In an example embodiment, line L2, parallel to axis AR, passes through in sequence and in direction AD1, body portion 138, a segment 108, and a tab 142. In an example embodiment, line L2 passes through hub 102 and ring 104.

In an example embodiment, each segment 108 includes at least one notch extending radially inward from radially outermost surface 120. In an example embodiment, each segment 108 includes notch 144 and notch 146. A respective retention tab 142 is disposed in respective notches 144 and 146 for circumferentially adjacent segments 108. For example, tab 142A is disposed in notch 146 for segment 108A and in notch 144 for segment 108B.

In an example embodiment: cage 106 includes recesses 148 in body portion 138; and each wedge plate segment 108 includes protrusion 150 disposed in a respective recesses 148. In an example embodiment, recesses 148 are through-bores passing completely through material forming cage 106. For example, protrusion 150A for segment 108B passes through through-bore 148A. As further described below, segments 108 are radially displaceable such that protrusions 150 are radially displaceable within respective through-bores 148.

For example, through-bores 148 extend further along axis A (orthogonal to axis AR) than in opposite circumferential directions CD1 or CD2. For example, circumferential dimension 151 of through-bores 148 is only slightly larger than outside diameter 152 of protrusions 150, such that there is nominal play in direction CD1 or CD2 between segments 108 and cage 106 when protrusions 150 are disposed in through-bores 148. However, length 154, in radial direction RD1, of through-bores 148 is sufficiently larger than diameter 152 to enable protrusions 150 to displace in through-bores 148 along axis A to enable the free-wheel and locked modes described below. For example, radial gaps 155 are formed between protrusions 150 and edges 156 of through-bores 148.

Figure 10:
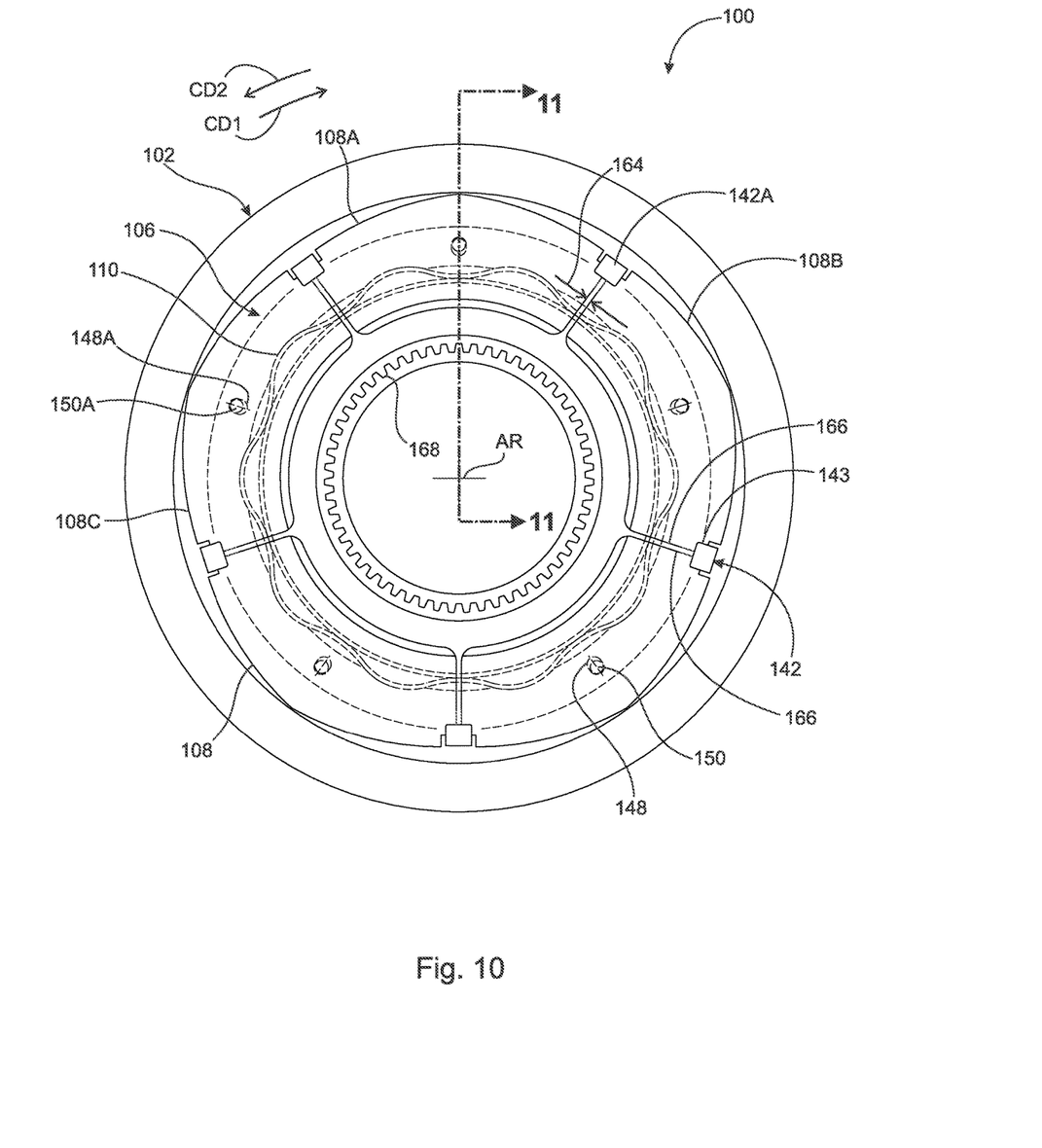
FIG. 10 is a front view of the wedge clutch in FIG. 1, in a free-wheel mode.

FIG. 10 is a front view of wedge clutch 100 in FIG. 1 in a free-wheel mode.

Figure 11:
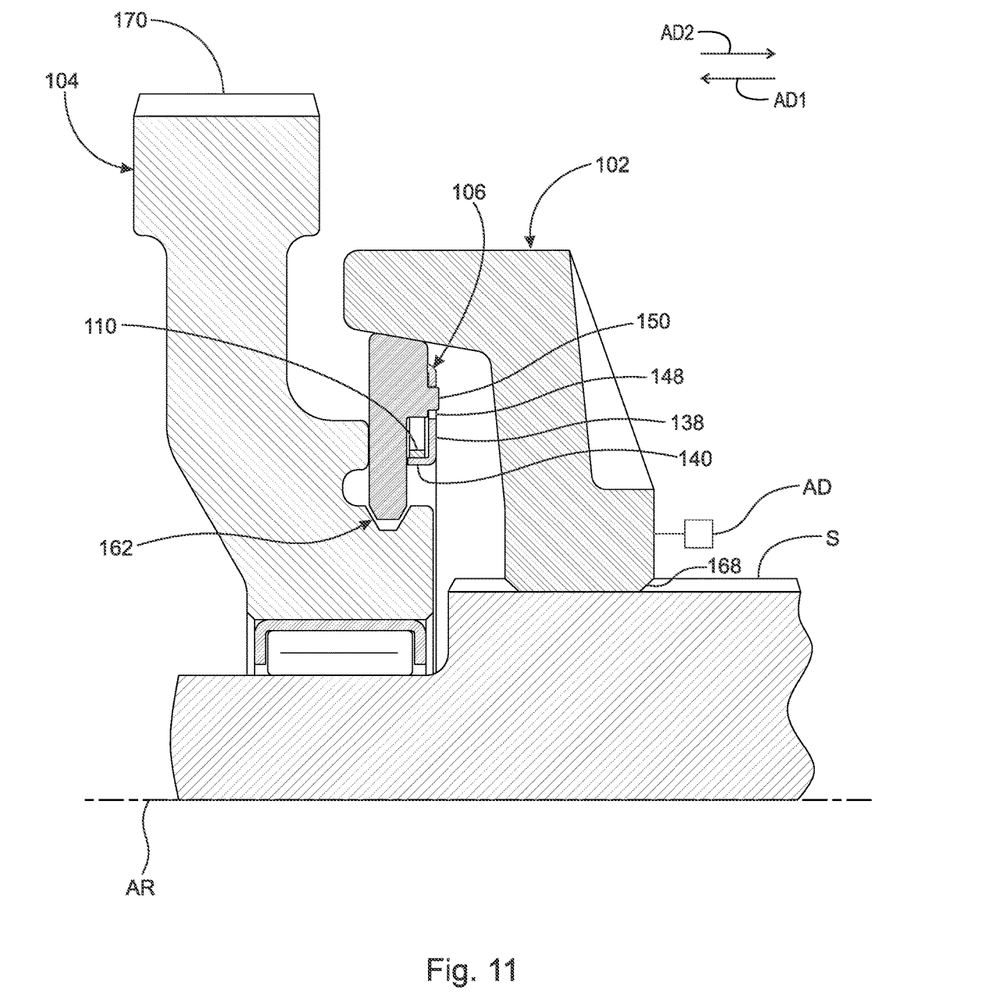
FIG. 11 is a cross-sectional view generally along line 11-11 in FIG. 10.

FIG. 11 is a cross-sectional view generally along line 11-11 in FIG. 10. The following should be viewed in light of FIGS. 1 through 11. In the example of FIG. 2, surface 112 of hub 102 and surfaces 120 of segments 108 slope radially inward in direction AD2. That is, radius 157 of surface 112 and radius 158 of surfaces 120 decrease moving in direction AD2. To transition from the locked mode of FIGS. 1 and 2 (in which hub 102, ring 104 and segments 108 are non-rotatably connected), to the free-wheel mode shown in FIG. 10: hub 102 is axially displaced in axial direction AD2, for example by actuator device AD. Device AD can be any actuator known in the art, including, but not limited to a mechanical actuator, hydraulic actuator, electric actuator, pneumatic actuator, or electro-mechanical actuator. By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

As hub 102 displaces in direction AD2, surface 112 slides down surfaces 120, and resilient element 110, reacting to radially fixed flange 140, displaces wedge plate segments 108 radially outward in radial direction RD1 to maintain contact between hub 102 (surface 112) and wedge plate segments 108 (surfaces 120). As segments 108 displace in direction RD1, inner surfaces 160 of segments 108 break contact with outer surface 162 of ring 104 and segments 108 (along with hub 102) are rotatable with respect to inner ring 104. In an example embodiment, each surface 160 is at uniform radius 163 from axis AR. Radius 163 changes as segments 108 displace radially; however, at any point in time, all points along surface 160 are at uniform radius 163.

As hub 102 displaces in axial direction AD2: resilient element 110 unwinds, expands, or decompresses, in radial direction RD1; and protrusions 150 slide through through-bores 148 in direction RD1. As noted above, dimension 151 of through-bores 148 is only slightly larger than diameter 152 of protrusions 150. As a result, there is nominal circumferential movement of segments 108 with respect to cage 106 as segments 108 displace radially outward.

To transition from the free-wheel mode to the locked mode, hub 102 is axially displaced, for example by device AD, in axial direction AD1, to displace segments 108 radially inwardly in radial direction RD2 into contact with inner ring 104. Thus, to implement the locked mode, surface 120 slides up surfaces 120, forcing segments 108, in particular surfaces 160 of segments 108, radially inward to contact ring 104, in particular surface 162. Hub 102 continues to displace in direction AD1 until circumferential torque, for example from the rotation of hub 102, causes wedge plate segments 108 to non-rotatably connect to hub 102 and inner ring 104, which non-rotatably connects hub 102 and ring 104. In the locked mode, torque from a driving shaft, for example shaft S, is transmitted to a driven shaft (not shown), for example non-rotatably connected to ring 104.

As segments 108 are displaced radially inward in direction RD2: resilient element 110 is compressed in radial direction RD2 between shoulders 130 and cage 106, for example, between shoulders 130 and flange 140; and protrusions 150 slide through through-bores 148 in direction RD2. As in the example embodiment noted above, since dimension 151 of through-bores 148 is only slightly larger than diameter 152 of protrusions 150, and there is nominal circumferential movement of segments 108, with respect to cage 106, as segments 108 displace radially inward. Therefore, a consistent circumferential orientation and spacing of segments 108 is maintained. For example, circumferential spacing 164 between segments 108 is evenly maintained between all the adjacent segments 108. In an example embodiment, edges 166 of circumferentially adjacent segments 108 are in contact in the locked mode.

As noted above, for the transition from the free-wheel mode to the locked mode, the displacement of hub 102 in direction AD1 causes frictional engagement of surfaces 160 and 162. Circumferential torque from hub 102, in direction CD1 or CD2, in combination with the frictional engagement of surface 160 and 162, causes rotation of hub 102 with respect to segments 108.

For example, for rotation of hub 102 in direction CD1, the frictional engagement of surfaces 160 and 162 hinders rotation of segments 108, and ramps 124, with respect to hub 102. Thus, ramps 116 slide up ramps 124 to frictionally and compressively engage ramps 116 and ramps 124, and non-rotatably connect hub 102, segments 108, and ring 104. Friction contact force is borne by ramps 116 and 124. That is, torque is transmitted from hub 102 to ring 104 via ramps 116 and 124. Ramps 114 and 122 do not transmit torque.

For example, for rotation of hub 102 in direction CD2, the frictional engagement of surfaces 160 and 162 hinders rotation of segments 108, and ramps 122, with respect to hub 102. Thus, ramps 114 slide up ramps 122 to frictionally and compressively engage ramps 114 and ramps 122, and non-rotatably connect hub 102, segments 108 and ring 104. Friction contact force is borne by ramps 114 and ramps 122. That is, torque is transmitted from hub 102 to ring 104 via ramps 114 and 122. Ramps 116 and 124 do not transmit torque.

The following provides further detail regarding wedge clutch 100. In an example embodiment: hub 102 includes spline teeth 168 arranged to non-rotatably connect to shaft S; and ring 104 includes ring gear 170 arranged to non-rotatably connect to a shaft (not shown). Thus: in the locked mode, clutch 100 non-rotatably connects shaft S and a shaft (not shown) non-rotatably connected to gear 170; and in the free-wheel mode, clutch 100 enables relative rotation between shaft S and the other shaft. In an example embodiment, surfaces 160 include chamfered surfaces 172, and surface 162 includes groove 174 with chamfered surfaces 176.

Although clutch 100 is shown with a particular number of wedge plate segments 108, it should be understood that clutch 100 is not limited to the number of segments 108 shown and that other numbers of segments 108 are possible. Although clutch 100 is shown with a particular axial orientation, it should be understood that other axial orientations are possible. For example, the axial orientation of cage 106 and segments 108 could be reversed so that flange 140 extends in direction AD2 from portion 138, and protrusions 150 extend in direction AD1 from segments 108.

Advantageously, clutch 100 solves the problems noted above of: unequal locking pressure in a locked mode; unequal radial movement of the wedge segments; and concentration of friction contact forces on a smaller inner diameter. In particular, resilient element 110 applies an equal force in direction RD1 to each segment 108, ensuring that segments 108 displace radially inward and radially outward in unison. For example, radius 158 changes uniformly for all of segments 108 during transitions between the locked and free-wheel mode, and radius 158 is uniform for each of segments 108 in the locked mode. Thus, equal locking pressure is applied by each of segments 108 during the locked mode.

As noted above, during free-wheel mode, centrifugal force urges wedge plate radially outward, and for prior art configurations, can cause unintended transition to the locked mode. However, since segments 108 are in contact with hub 102 during the free wheel mode and segments 108 are displaced radially inward to implement the locked mode, the centrifugal force during the free wheel mode cannot result in an unintended transition to the locked mode. If fact, the centrifugal force makes such a transition even more difficult by urging segments 108 radially outward into the free-wheel position.

Regarding friction contact force, as noted above, prior art wedge plate clutches place pairs of ramps on the smaller inner diameter of the wedge plate or wedge plate segments. Only one respective ramp for each pair of ramps (depending on the direction of rotation for the torque transmitting shaft) bears the contact friction force. However, ramps 122 and 124 of segments 108 are on radially outermost surface 120. Thus, circumferential extents 178 and 180 of ramps 114/116 and ramps 122/124, respectively, are considerably larger than if ramps 114 and 116 were on surface 160 of segments 108. As a result, the area of contact between ramps 114 and 122 and between ramps 116 and 124 is greatly enlarged as compared to the area of engagement for ramps in prior art wedge plate clutches; therefore, the torque transmitting capacity of clutch 100 is increased. In addition, since respective entireties of inner surfaces 160 of segments 108 are in contact with outer surface 162 of ring 104, the torque transmitting capacity of inner surfaces 160 is maximized.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object

| Reference | Description |
|---|---|
| 14 | object |
| 15A | surface |
| 15B | surface |
| 15C | edge |
| 16A | surface |
| 16B | edge |
| 17A | radius |
| 17B | radius |
| 18 | surface |
| 19 | circumference |
| 20 | radius |
| 100 | wedge clutch |
| AR | axis of rotation |
| 102 | hub |
| 104 | inner ring |
| 106 | cage |
| 108 | circumferentially aligned wedge plate segments |
| 108A | wedge plate segment |
| 108B | wedge plate segment |
| 110 | resilient element/wave spring |
| 112 | radially inwardly facing surface of hub 102 |
| 114 | ramp |
| 116 | ramp |
| 118 | center portion |
| 120 | radially outermost surface of segments 108 |
| 122 | ramp |
| 124 | ramp |
| 126 | center portion |
| 128 | radially extending body portion |
| 130 | shoulder |
| 132 | radially innermost surface |
| 134 | recess |
| 136 | peak area |
| 138 | radially extending body portion |
| 140 | flange |
| L1 | line |
| L2 | line |
| 142 | retention tabs |
| 142A | tab |
| 144 | notch |
| 146 | notch |
| 148 | recess/through-bore |
| 148A | recess |
| 150 | protrusion |
| 150A | protrusion |
| A | axis |
| 151 | circumferential dimension |
| 152 | outside diameter |
| 154 | length in radial direction RD1 |
| 155 | radial gap |
| 156 | edge |
| 157 | radius for hub 102 |
| 158 | radius for segments 108 |
| AD | actuator device |
| 160 | inner surfaces of segments 108 |
| 162 | outer surface of ring 104 |
| 164 | circumferential spacing between segments 108 |
| 166 | edge of segment 108 |
| 168 | spline teeth |
| S | shaft |
| 170 | ring gear |
| 172 | chamfered surface |
| 174 | groove |
| 176 | chamfered surface |
| F | force |

What is claimed is:

1. A wedge clutch, comprising:
an axis of rotation;
a hub;
an inner ring located radially inward of the hub;
a cage radially disposed between the hub and the inner ring;
a plurality of circumferentially aligned wedge plate segments radially disposed between the hub and the inner ring; and,
a circumferentially continuous resilient element:
engaged with the cage and the plurality of circumferentially aligned wedge plate segments; and,
urging the plurality of circumferentially aligned wedge plate segments radially outward.

2. The wedge clutch of claim 1, wherein:
each wedge plate segment includes a radially outermost surface; and,
at least a portion of the radially outermost surface is in contact with the hub.

3. The wedge clutch of claim 1, wherein:
the cage includes a flange extending in an axial direction; and,
the circumferentially continuous resilient element is engaged with the flange.

4. The wedge clutch of claim 3, wherein the flange, the circumferentially continuous resilient element, and the plurality of wedge plate segments, are radially aligned.

5. The wedge clutch of claim 1, wherein:
the cage includes:
a radially extending body portion; and,
a plurality of retention tabs extending from the radially extending body portion in a first axial direction; and,
each retention tab, included in the plurality of retention tabs, overlaps, in the first axial direction, respective first and second circumferentially adjacent wedge plate segments.

6. The wedge clutch of claim 5, wherein the radially extending body portion; a first wedge plate segment included in the plurality of wedge plate segments; and a bending portion of a first retention tab, included in the plurality of retention tabs, are axially aligned.

7. The wedge clutch of claim 5, wherein:
the respective first circumferentially adjacent wedge plate segment includes a notch extending radially inward from a radially outermost surface of the respective first circumferentially adjacent wedge plate segment;
the respective second circumferentially adjacent wedge plate segment includes a notch extending radially inward from a radially outermost surface of the respective second circumferentially adjacent wedge plate segment; and,
said each retention tab is disposed in the respective notches for the respective first and second circumferentially adjacent wedge plate segments.

8. The wedge clutch of claim 1, wherein:
the cage includes:
a radially extending body portion; and,
a plurality of recesses or through-bores in the radially extending body portion; and,
each wedge plate segment includes a protrusion disposed in a respective recess or through-bore.

9. The wedge clutch of claim 8, wherein the plurality of circumferentially aligned wedge plate segments are radially displaceable such that the protrusion for said each wedge plate is radially displaceable within the respective recess or through-bore.

10. The wedge clutch of claim 1, wherein:
each wedge plate segment includes:
  a radially extending body portion; and,
  a shoulder extending from the body portion in an axial direction; and,
the circumferentially continuous resilient element is engaged with the shoulder for said each wedge plate segment.

11. The wedge clutch of claim 10, wherein:
the shoulder for said each wedge plate segment includes a radially innermost surface;
the radially innermost surface includes at least one recess extending radially outward; and,
the circumferentially continuous resilient element is engaged with the at least one recess for said each wedge plate segment.

12. The wedge clutch of claim 1, wherein:
the hub includes a radially inwardly facing surface sloping radially outward in a first axial direction;
for a locked mode:
  the hub is axially displaceable in the first axial direction to displace the plurality of circumferentially aligned wedge plate segments radially inward into contact with the inner ring; and,
  the plurality of circumferentially aligned wedge plate segments are arranged to non-rotatably connect to the hub and the inner ring; and,
for a free-wheel mode:
  the hub is axially displaceable in a second axial direction, opposite the first axial direction;
  the circumferentially continuous resilient element is arranged to displace the plurality of circumferentially aligned wedge plate segments radially outward to maintain contact between the hub and the plurality of circumferentially aligned wedge plate segments; and,
  the hub is rotatable with respect to the inner ring.

13. The wedge clutch of claim 12, further comprising:
an actuator device, wherein:
  for the locked mode, the actuator device is arranged to displace the hub in the first axial direction; and,
  for the free-wheel mode, the actuator device is arranged to displace the hub in the second axial direction.

14. The wedge clutch of claim 1, wherein:
a wedge plate segment includes a radially outermost surface including:
  a first ramp surface sloping radially inwardly in a first circumferential direction; and,
  a second ramp surface sloping radially inwardly, and away from the first ramp surface, in a second circumferential direction, opposite the first circumferential direction;
the hub includes a radially inwardly facing surface including:
  a first ramp surface sloping radially inwardly in the first circumferential direction; and,
  a second ramp surface sloping radially inwardly, and away from the first ramp surface, for the hub in the second circumferential direction; and,
in the locked mode:
  the respective first ramps for the wedge plate segment and the hub are compressively engaged; or,
  the respective second ramps for the wedge plate segment and the hub are compressively engaged.

15. The wedge clutch of claim 1, wherein each wedge plate segment includes a radially innermost surface at a uniform radial distance from the axis of rotation.

16. A wedge clutch, comprising:
an axis of rotation;
a hub including a surface sloping radially outward in a first axial direction;
an inner ring located radially inward of the hub;
a plurality of circumferentially aligned wedge plate segments:
  radially disposed between the hub and the inner ring; and,
  in contact with the hub;
a cage radially disposed between the hub and the inner ring and including a plurality of retention tabs, each retention tab overlapping a respective pair of circumferentially aligned wedge plate segments; and,
a resilient element engaged with the cage and the plurality of circumferentially aligned wedge plate segments, wherein:
  for a locked mode:
    the hub is axially displaceable in the first axial direction to displace the plurality of circumferentially aligned wedge plate segments radially inward into contact with the inner ring; and,
    the plurality of circumferentially aligned wedge plate segments is arranged to non-rotatably connect to the hub and the inner ring; and,
  for a free-wheel mode:
    the hub is axially displaceable in a second axial direction, opposite the first axial direction;
    the resilient element is arranged to displace the plurality of circumferentially aligned wedge plate segments radially outward; and,
    the hub is rotatable with respect to the inner ring.

17. The wedge clutch of claim 16, wherein:
the cage includes:
  a radially extending body portion; and,
  a flange extending from the radially extending body in the first axial direction;
each wedge plate segment includes:
  a radially extending body portion; and,
  a shoulder extending from the body portion in the second axial direction; and,
the resilient element is engaged with the flange and with the shoulder for said each wedge plate segment.

18. The wedge clutch of claim 16, wherein:
the cage includes:
  a radially extending body portion; and,
  a plurality of through-bores passing through the radially extending body portion;
each wedge plate segment includes a protrusion disposed in a respective through-bore; and,
a length of the respective through-bore, in a radial direction, is greater than a circumferential dimension of the respective through-bore.

19. A wedge clutch, comprising:
an axis of rotation;
a hub including a surface with:
  at least one first ramp surface sloping radially inwardly in a first circumferential direction; and,
  at least one second ramp surface, connected to the at least one first ramp surface, and sloping radially inwardly in a second circumferential direction, opposite the first circumferential direction, from the at least one first ramp surface;
an inner ring located radially inwardly of the hub; and, a plurality of wedge plate segments, each wedge plate segment including a radially outer surface with:
- a respective third ramp surface sloping radially inwardly in the first circumferential direction; and,
- a respective fourth ramp surface, connected to the respective third ramp surface, and sloping radially inwardly, in the second circumferential direction, from the respective third ramp surface, wherein to implement a locked mode in which the plurality of wedge plate segments is non-rotatably connected to the hub and to the inner ring:
  - the hub is rotatable in the first circumferential direction, with respect the plurality of wedge plate segment to frictionally engage the at least one second ramp surface and the respective fourth ramp surfaces; or,
  - the hub is rotatable in the second circumferential direction, with respect the plurality of wedge plate segments, to frictionally engage the at least one first ramp surface and the respective third ramp surfaces.

20. The wedge clutch of claim 19, wherein:

the at least one first ramp surface includes a plurality of first ramp surfaces; and the at least one second ramp surface includes a plurality of second ramp surfaces, the wedge plate clutch further comprising:
- a resilient element urging:
  - the plurality of first ramp surfaces and the respective third ramp surfaces into contact; or,
  - the plurality of second ramp surfaces and the respective fourth ramp surfaces into contact.

* * * * *